(12) United States Patent
Maeda et al.

(10) Patent No.: US 8,086,626 B2
(45) Date of Patent: Dec. 27, 2011

(54) RARE PATTERN EXTRACTING DEVICE AND RARE PATTERN EXTRACTING METHOD

(75) Inventors: Kazuho Maeda, Kawasaki (JP); Yoshinori Yaginuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 12/326,640

(22) Filed: Dec. 2, 2008

(65) Prior Publication Data

US 2009/0150391 A1 Jun. 11, 2009

(30) Foreign Application Priority Data

Dec. 5, 2007 (JP) .................. 2007-315028

(51) Int. Cl.
*G06F 7/00* (2006.01)
*G06F 17/30* (2006.01)

(52) U.S. Cl. ............ 707/769; 704/9; 715/248; 715/273
(58) Field of Classification Search ............... None
See application file for complete search history.

(56) References Cited

U.S. PATENT DOCUMENTS

| 5,251,131 | A  | * | 10/1993 | Masand et al. ............... 704/9 |
| 6,092,064 | A  | * | 7/2000  | Aggarwal et al. ........... 707/694 |
| 7,574,652 | B2 | * | 8/2009  | Lennon et al. ............. 715/248 |
| 7,644,361 | B2 | * | 1/2010  | Wu et al. .................. 715/273 |

FOREIGN PATENT DOCUMENTS

| JP | 2000-155681 | 6/2000 |
| JP | 2007-109012 | 4/2007 |

* cited by examiner

*Primary Examiner* — Tim T Vo
*Assistant Examiner* — Loan T Nguyen
(74) *Attorney, Agent, or Firm* — Staas & Halsey LLP

(57) ABSTRACT

A rare pattern that may be difficult to extract is extracted by extracting data where a rare pattern is likely to exist, and then generating the rare pattern using a degree of influence.

11 Claims, 17 Drawing Sheets

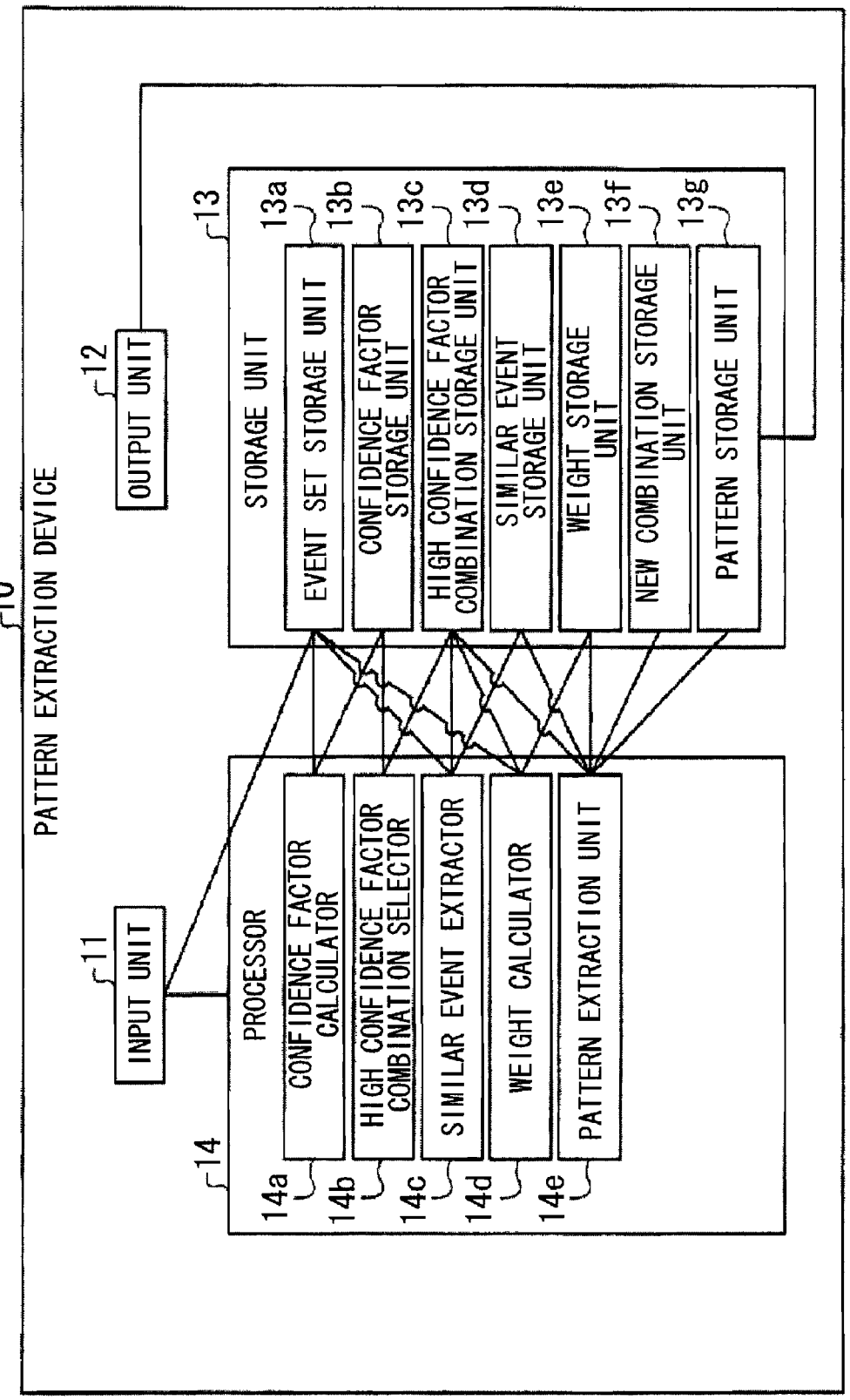

FIG. 2A

| DATA ID | ITEM OF GOODS | AMOUNT OF MONEY | FREQUENCY OF USAGE | LABEL |
|---|---|---|---|---|
| DATA 1 | ELECTRIC APPLIANCE | 50,000yen | TWICE | NORMAL |
| DATA 2 | NOBLE METAL | 200,000yen | TWICE | INJUSTICE |
| DATA 3 | ELECTRIC APPLIANCE | 400,000yen | FOUR TIMES | NORMAL |
| ... | | | | |
| DATA 80 | ELECTRIC APPLIANCE | 200,000yen | ONCE | NORMAL |

FIG. 2B

| ITEM OF GOODS | AMOUNT OF MONEY | FREQUENCY OF USAGE | LABEL NUMBER |
|---|---|---|---|
| ELECTRIC APPLIANCE | 0yen – 300,000yen | ONCE – THRICE | 8, 2 |
| ELECTRICAL APPLIANCE | 0yen – 300,000yen | FOUR TIMES OR MORE | 0, 10 |
| ELECTRICAL APPLIANCE | 300,000yen OR MORE | ONCE – THRICE | 10, 0 |
| ELECTRICAL APPLIANCE | 300,000yen OR MORE | FOUR TIMES OR MORE | 4, 6 |
| NOBLE METAL | 0yen – 300,000yen | ONCE – THRICE | 8, 2 |
| NOBLE METAL | 0yen – 300,000yen | FOUR TIMES OR MORE | 10, 0 |
| NOBLE METAL | 300,000yen OR MORE | ONCE – THRICE | 1, 9 |
| NOBLE METAL | 300,000yen OR MORE | FOUR TIMES OR MORE | 4, 6 |

FIG. 3

| ITEM OF GOODS | AMOUNT OF MONEY | FREQUENCY OF USAGE | LABEL NUMBER | CONFIDENCE FACTOR | |
|---|---|---|---|---|---|
| ELECTRIC APPLIANCE | 0yen – 300,000yen | ONCE – THRICE | 8, 2 | 0.2 | (1) |
| ELECTRICAL APPLIANCE | 0yen – 300,000yen | FOUR TIMES OR MORE | 0, 10 | 0.5 | (2) |
| ELECTRICAL APPLIANCE | 300,000yen OR MORE | ONCE – THRICE | 10, 0 | | (3) |
| ELECTRICAL APPLIANCE | 300,000yen OR MORE | FOUR TIMES OR MORE | 4, 6 | 0.6 | (4) |
| NOBLE METAL | 0yen – 300,000yen | ONCE – THRICE | 8, 2 | 0.2 | (5) |
| NOBLE METAL | 0yen – 300,000yen | FOUR TIMES OR MORE | 10, 0 | | (6) |
| NOBLE METAL | 300,000yen OR MORE | ONCE – THRICE | 1, 9 | 0.45 | (7) |
| NOBLE METAL | 300,000yen OR MORE | FOUR TIMES OR MORE | 4, 6 | 0.6 | (8) |

FIG. 4A

| ITEM OF GOODS | AMOUNT OF MONEY | FREQUENCY OF USAGE | LABEL NUMBER | CONFIDENCE FACTOR |
|---|---|---|---|---|
| ELECTRICAL APPLIANCE | 0yen – 300,000yen | FOUR TIMES OR MORE | 0, 10 | 0.5 |
| ELECTRICAL APPLIANCE | 300,000yen OR MORE | FOUR TIMES OR MORE | 4, 6 | 0.6 |
| NOBLE METAL | 300,000yen OR MORE | ONCE – THRICE | 1, 9 | 0.45 |
| NOBLE METAL | 300,000yen OR MORE | FOUR TIMES OR MORE | 4, 6 | 0.6 |

FIG. 4B

| ITEM OF GOODS | AMOUNT OF MONEY | FREQUENCY OF USAGE | LABEL NUMBER | CONFIDENCE FACTOR |
|---|---|---|---|---|
| ELECTRICAL APPLIANCE | 0yen – 300,000yen | FOUR TIMES OR MORE | 0, 10 | 0.5 |
| ELECTRICAL APPLIANCE | 300,000yen OR MORE | FOUR TIMES OR MORE | 4, 6 | 0.6 |

FIG. 5A

| ITEM OF GOODS | AMOUNT OF MONEY | FREQUENCY OF USAGE | LABEL NUMBER |
|---|---|---|---|
| ELECTRICAL APPLIANCE | 300,000yen OR MORE | FOUR TIMES OR MORE | 4, 6 |
| NOBLE METAL | 0yen – 300,000yen | FOUR TIMES OR MORE | 10, 0 |
| NOBLE METAL | 300,000yen OR MORE | ONCE – THRICE | 1, 9 |
| NOBLE METAL | 300,000yen OR MORE | FOUR TIMES OR MORE | 4, 6 |

FIG. 5B

| ITEM OF GOODS | AMOUNT OF MONEY | FREQUENCY OF USAGE | LABEL NUMBER |
|---|---|---|---|
| ELECTRICAL APPLIANCE | 0yen – 300,000yen | FOUR TIMES OR MORE | 0, 10 |
| ELECTRICAL APPLIANCE | 300,000yen OR MORE | ONCE – THRICE | 10, 0 |
| ELECTRICAL APPLIANCE | 300,000yen OR MORE | FOUR TIMES OR MORE | 4, 6 |
| NOBLE METAL | 300,000yen OR MORE | FOUR TIMES OR MORE | 4, 6 |

FIG. 6A

|  | WEIGHT |
|---|---|
| ELECTRICAL APPLIANCE | 0.025 |
| NOBLE METAL | 0.025 |
| 0yen – 300,000yen | 0.183 |
| 300,000yen OR MORE | 0.174 |
| ONCE – THRICE | 0.235 |
| FOUR TIMES OR MORE | 0.222 |

FIG. 6B

|  | WEIGHT |
|---|---|
| NOBLE METAL | 0.05 |
| 300,000yen OR MORE | 0.357 |
| FOUR TIMES OR MORE | -0.249 |

FIG. 6C

|  | WEIGHT |
|---|---|
| ELECTRICAL APPLIANCE | 0.034 |
| 300,000yen OR MORE | -0.294 |
| FOUR TIMES OR MORE | 0.384 |

FIG. 7A

| ITEM OF GOODS | AMOUNT USED |
|---|---|
| NOBLE METAL | FOUR TIMES OR MORE |

FIG. 7B

| ITEM OF GOODS | AMOUNT USED |
|---|---|
| ELECTRICAL APPLIANCE | FOUR TIMES OR MORE |

FIG. 8A

| ITEM OF GOODS | AMOUNT USED |
|---|---|
| NOBLE METAL | 300,000yen OR MORE |

FIG. 8B

| ITEM OF GOODS | AMOUNT USED |
|---|---|
| NOBLE METAL | 300,000yen |
| ELECTRICAL APPLIANCE | FOUR TIMES OR MORE |

FIG. 11

| ITEM OF GOODS | AMOUNT OF MONEY | FREQUENCY OF USAGE | LABEL NUMBER |
|---|---|---|---|
| ELECTRIC APPLIANCE | 0yen – 300,000yen | ONCE – THRICE | 8, 2 |
| ELECTRICAL APPLIANCE | 0yen – 300,000yen | FOUR TIMES OR MORE | 0, 10 |
| ELECTRICAL APPLIANCE | 300,000yen OR MORE | ONCE – THRICE | 10, 0 |
| ELECTRICAL APPLIANCE | 300,000yen OR MORE | FOUR TIMES OR MORE | 4, 6 |
| NOBLE METAL | 0yen – 300,000yen | ONCE – THRICE | 8, 2 |
| NOBLE METAL | 0yen – 300,000yen | FOUR TIMES OR MORE | 10, 0 |

FIG. 12

| ITEM OF GOODS | AMOUNT OF MONEY | FREQUENCY OF USAGE | LABEL NUMBER | CONFIDENCE FACTOR | |
|---|---|---|---|---|---|
| ELECTRIC APPLIANCE | 0yen – 300,000yen | ONCE – THRICE | 8, 2 | 0.1 | (1) |
| ELECTRICAL APPLIANCE | 0yen – 300,000yen | FOUR TIMES OR MORE | 0, 10 | 0.8 | (2) |
| ELECTRICAL APPLIANCE | 300,000yen OR MORE | ONCE – THRICE | 10, 0 | | (3) |
| ELECTRICAL APPLIANCE | 300,000yen OR MORE | FOUR TIMES OR MORE | 4, 6 | 0.8 | (4) |
| NOBLE METAL | 0yen – 300,000yen | ONCE – THRICE | 8, 2 | 0.1 | (5) |
| NOBLE METAL | 0yen – 300,000yen | FOUR TIMES OR MORE | 10, 0 | | (6) |

FIG. 13

|  | WEIGHT |
|---|---|
| ELECTRICAL APPLIANCE | 0.241 |
| NOBLE METAL | 0.636 |
| 0yen - 300,000yen | 0.037 |
| 300,000yen OR MORE | 0.077 |
| ONCE - THRICE | 0.529 |
| FOUR TIMES OR MORE | 0.391 |

FIG. 14

| ITEM OF GOODS | AMOUNT OF MONEY | FREQUENCY OF USAGE | LABEL NUMBER | CONFIDENCE FACTOR |
|---|---|---|---|---|
| ELECTRICAL APPLIANCE | 0yen – 300,000yen | FOUR TIMES OR MORE | 0, 10 | 0.8 |
| ELECTRICAL APPLIANCE | 300,000yen OR MORE | FOUR TIMES OR MORE | 4, 6 | 0.8 |

RARE PATTERN EXTRACTING DEVICE AND RARE PATTERN EXTRACTING METHOD

CROSS-REFERENCE TO RELATED APPLICATIONS

This application is based upon and claims the benefit of priority of the prior Japanese Patent Application No. 2007-315028, filed on Dec. 5 2007, the entire contents of which are incorporated herein by reference.

FIELD

The present invention relates to a technique of extracting a rare pattern corresponding to a pattern of rare cases from a data base in which enormous numbers of event data are stocked.

BACKGROUND

Conventionally, there is a pattern extracting device in that a combination of explaining variable values, in which a rate at which events having a specific target variable value as a constituent element are contained in all events having the combination of predetermined explaining variable values as a constituent element satisfies a predetermined satisfaction level, is extracted from an event set containing plural events constructed by associating the combination of explaining variable values representing the condition of each explaining variable with a target variable value representing the condition of a target variable (e.g., refer to Japanese Laid-open Patent Publication No. 2007-109012).

The event is constructed by associating the combination of explaining variable values representing the condition of each explaining variable with a target variable value representing the condition of a target variable. For example, the event corresponds to sales data which is collected from each outlet store by POS (Point Of Sale) system every time a credit card is used. Furthermore, the event set corresponds to information containing plural events.

The sales data are constructed by associating an item of goods sold, the total amount of money and a monthly use frequency of a credit card with data ID.

Furthermore, a label representing whether use of the credit card is normal or unjust is allocated in association with the data ID.

The variable is information representing a category such as an item of goods, the amount of money, frequency of use, label or the like.

The variable value is a value representing the condition of a variable and it contains a value represented by a character array (for example, "noble metal"), a numerical value (for example, "50,000 yen"), a value representing a range of the numerical values (for example, "100,000 yen to 150,000 yen"), etc.

The variable value representing the condition of the item of goods is a character array representing the name of goods (for example, "noble metal", "electrical appliance", etc.), the variable value representing the condition of the amount of money is a numerical value representing the amount of money (for example, "50,000 yen", "100,000 yen"), the variable value representing the condition of the monthly use frequency of the credit card is a numerical value representing use frequency (for example, "once", "twice"), and the variable value of the label is "normal use" or "unjust use".

Here, when a pattern of goods purchased by a user who uses a credit card once a month is extracted, the following is applied. That is a monthly use frequency of a credit card corresponds to the target variable and "once" corresponds to the target variable value, and an item of goods, an amount of money, and a label correspond to explaining variables, and "noble metal" and "electrical appliance" corresponds to explaining variables values of items, "50,000 yen", "200,000 yen", etc. correspond to explaining variable values of the amount of money.

Based on above assumptions, a case is explained in which a pattern of purchase by a user who uses a credit card once a month is extracted.

Firstly, in a conventional technique, among each sales data with an explaining variable value of "once" as a constituent element, rates of sales data with an explaining variable value "noble metal" as a constituent element and that with an explaining variable value "electrical appliance" are compared.

If the rate of sales data with the explaining variable value of "noble metal" as the constituent element is judged to be higher, in the conventional technique, a price range that includes the sales data of the constituent element most (e.g., 100,000 yen to 150,000 yen) is selected.

Then, in the conventional technique, for each sales data having a combination of the selected explaining variable values, "noble metal", "once", and "100,000 yen to 150,000 yen" as constituent elements, when the number of events satisfies a predetermined satisfaction level (e.g., 20 or more), and a rate that includes a target variable value "once" as a constituent element satisfies a predetermined satisfaction level (e.g., 75%), the following pattern is extracted. The pattern is a combination of explaining variable values "100,000 yen to 150,000 yen" and "noble metal", and a target variable value is "once" (i.e., a pattern in that a user who uses a credit card once a month tends to purchase noble metal with a price range of 100,000 yen to 150,000 yen).

In above conventional technique, extracting a pattern of target variable values which are contained at a low rate as constituent elements is difficult. More specifically, target variable values which are contained at a low rate as constituent elements is obscured by other variable values of the target variables. As a result, extracting the pattern is difficult in conventional techniques.

For example, a pattern is assumed in which a rate of sales data that a label of a target variable value "unjust use" as a constituent element is low, but users who use a credit card unjustly tend to purchase electric appliances priced 300,000 yen or more.

A case is assumed, for each sales data that a label is a target variable value "unjust use" as a constituent element, rates of sales data with an explaining variable value "noble metal" as a constituent element, and that of "electrical appliance" as a constituent element are compared. The sales data that this pattern as a constituent element is hard to be reflected on sales data that an explaining variable value "electrical appliance" as a constituent element.

Therefore, some conventional techniques may judge a rate of sales data with a explaining variable value "noble metal" is higher. As a result, the pattern that users who use credit cards unjustly tend to purchase electrical appliances with the price 300,000 yen or more may not be extracted.

SUMMARY

There is provided a pattern extracting device, including method and computer readable recording media thereof, having a confidence factor calculating unit for calculating, for every event, a confidence factor representing the level of confidence that an event having a specific target variable value as a constituent element is contained in all events having combinations of predetermined explaining variable values as constituent elements; a high confidence factor combination selecting unit for selecting as a high confidence factor combination the combination of explaining variable values constituting an event in which the confidence factor calculated by the confidence factor calculating unit satisfies a predetermined threshold value; and a pattern extracting unit for extracting as the pattern the combination of the explaining variable values selected as the high confidence factor combination when a rate, at which an event having a specific target variable value as a constituent element is contained in all events having the high confidence factor combination selected by the high confidence factor combination selecting unit as a constituent element, satisfies a predetermined satisfaction level.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram showing the construction of a pattern extracting device;

FIGS. 2A and 2B are diagrams showing an example of information stored in an event set storage unit;

FIG. 3 is a diagram showing an example of information stored in a confidence factor storage unit;

FIGS. 4A and 4B are diagrams showing an example of information stored in a high certainty combination storage unit;

FIGS. 5A and 5B are diagrams showing an example of information stored in a similar event storage unit;

FIGS. 6A to 6C are diagrams showing an example of information stored in an weight storage unit;

FIGS. 7A and 7B are diagrams showing an example of information stored in a new combination storage unit;

FIGS. 8A and 8B are diagrams showing an example of information stored in a pattern storage unit;

FIG. 11 is a diagram showing an example of information stored in an event set storage unit according to a third embodiment;

FIG. 12 is a diagram showing an example of information stored in a confidence factor storage unit according to the third embodiment;

FIG. 13 is a diagram showing an example of information of an weight storage unit according to the third embodiment;

FIG. 14 is a diagram showing an example of information stored in a confidence factor combination storage unit according to the third embodiment;

DETAILED DESCRIPTION OF THE PREFERRED EMBODIMENTS

Figure 9:
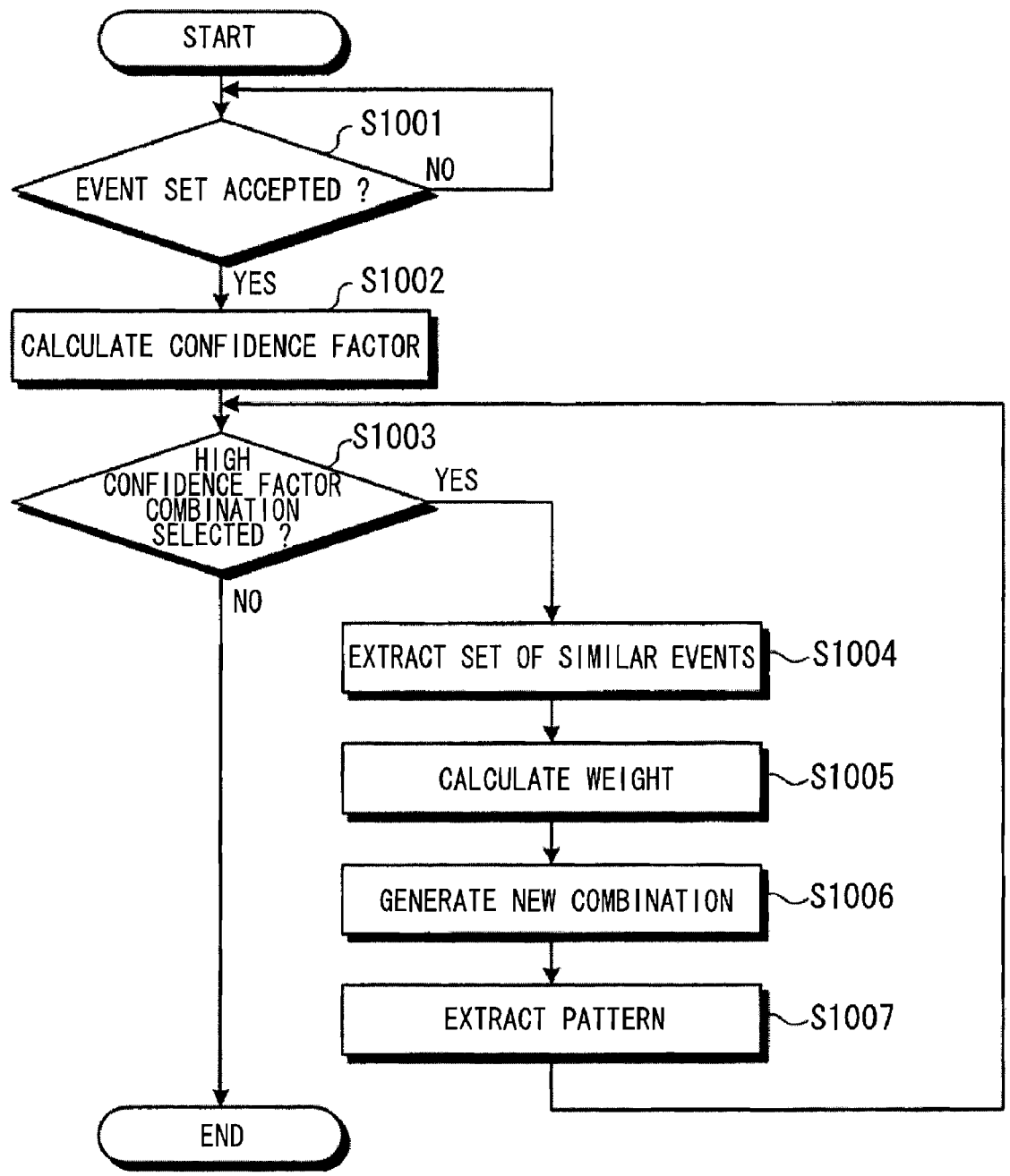
FIG. 9 is a flowchart showing the flow of processing by a pattern extracting device.

Embodiments of a pattern extracting apparatus according to the present invention will be described hereunder in detail with reference to the drawings. In the following description, the present invention will be described by using as non-limiting example embodiment an unjust pattern extracting device for extracting, from sales data, a merchandise purchase pattern of a user who unfairly uses a credit card.

First Embodiment

In the first embodiment described below, the summary and feature of a pattern extracting device according of the first embodiment, the construction of the pattern extracting device, the flow of processing of the pattern extracting device and an example of concrete processing of the pattern extracting device will be successively described in this order, and the effect of the first embodiment will be finally described.

[Summary and Feature of Pattern Extracting Device According to First Embodiment]

The pattern extracting device according to the first embodiment is summarized in that the combination of explaining variable values, in which a rate, at which events having a specific target variable value as a constituent element are contained in all events having the combination of predetermined explaining variable values as a constituent element, satisfies a predetermined satisfaction level, is extracted from an event set containing plural events, each event constructed by associating a combination of explaining variable values, which represent the condition of each explaining variable, with a target variable value, which represents the condition of a target variable. Then, the pattern extracting device according to the first embodiment calculates, for every event, a confidence factor representing a degree of confidence at which events having a specific target variable value as a constituent element are contained in all events having the combination of predetermined explaining variable values as a constituent element, and selects the confidence factor as a high confidence factor combination of explaining variable values constituting an event in which the confidence factor satisfies a predetermined threshold value. Then, the combination of the explaining variable values selected as a high confidence factor combination is extracted as a pattern when the rate, at which the events having the specific target variable value as a constituent element are contained in all the events having the high confidence factor combination as a constituent element, satisfies a predetermined satisfaction level.

Accordingly, the pattern extracting device according to the first embodiment can easily extract a pattern of target variable values which are contained as constituent elements at a low rate.

[Construction of Pattern Extracting Device]

The construction of the pattern extracting device 10 will be described with reference to FIGS. 1 to 8B. FIG. 1 is a block diagram showing the construction of the pattern extracting device. FIGS. 2A and 2B are diagrams showing an example of information stored in an event set storage unit. FIG. 3 is a diagram showing an example of information stored in a confidence factor storage unit. FIGS. 4A and 4B are diagrams showing an example of information stored in a high confidence factor combination storage unit. FIGS. 5A and 5B are diagrams showing an example of information stored in a similar event storage unit. FIGS. 6A to 6C are diagrams showing an example of information stored in an weight storage unit. FIGS. 7A and 7B are diagrams showing an example of information stored in a new combination storage unit. FIGS. 8A and 8B are diagrams showing an example of information stored in a pattern storage unit. As shown in FIG. 1, the pattern extracting device 10 is equipped with an input unit 11, an output unit 12, a storage unit 13 and a processor 14.

The input unit 11 accepts an input of various kinds of information. Specifically, the input unit 11 has a keyboard, a mouse, a microphone, an input port, etc. When accepting an event set, the input unit 11 stores an event set into the event set storage unit 13a. When accepting a satisfaction level for judging whether the combination of explaining variable values selected as a high confidence factor combination is extracted as a pattern, the input unit 11 stores the satisfaction level into the processor 14.

The output unit 12 outputs various kinds of information. Specifically, the output unit 12 is constructed by a monitor (or a display, a touch panel), a speaker, an output port, etc., and outputs an extracted pattern.

The storage unit 13 stores data and programs necessary for various kinds of processing executed by the processor 14. Particularly, the storage unit 13 contains an event set storage unit 13a, a confidence factor storage unit 13b, a high confidence factor combination storage unit 13c, a similar event storage unit 13d, an weight storage unit 13e, a new combination storage unit 13f and a pattern storage unit 13g as units which are closely associated with the present invention.

The event set storage unit 13a stores an event set containing plural events constructed by associating the combination of explaining variable values representing the condition of each explaining variable with a target variable value representing the condition of a target variable (see FIG. 2A).

The confidence factor storage unit 13b stores a confidence factor representing the level of confidence at which plural events having a specific target variable value as a constituent element are contained in all the events having the combination of predetermined explaining variable values as a constituent element (see FIG. 3).

The high confidence factor combination storage unit 13c stores the combination of explaining variable values constituting an event in which the confidence factor satisfies a predetermined threshold value as a high confidence factor combination (see FIGS. 4A and 4B).

The similar event storage unit 13d stores a set of similar events which are similar to each event having a high confidence factor combination as a constituent element (see FIGS. 5A and 5B).

The weight storage unit 13e stores an weight used to generate the combination of new explaining variable values (see FIGS. 6A to 6C).

The new combination storage unit 13f stores the combination of new explaining variable values generated by the pattern extracting unit 14e (see FIGS. 7A and 7B).

The pattern storage unit 13g stores as a pattern the combination of explaining variable values in which the rate at which events having a specific target variable value as a constituent element are contained satisfies a predetermined satisfaction level (see FIGS. 8A and 8B).

The processor 14 has an internal memory for storing a control program such as OS (Operating System) or the like, programs defining various kinds of processing procedures, etc. and required data, and executes various kinds of processing on the basis of these programs and the data. The processor 14 has a confidence factor calculator 14a, a high confidence factor combination selector 14b, a similar event extracting unit 14c, an weight calculator 14d and a pattern extracting unit 14e.

The confidence factor calculator 14a calculates, for every event, a confidence factor representing the degree of reliability for containing an event having a specific target variable value as a constituent element. The confidence factor calculator 14a corresponds to "confidence factor calculating unit" described in claims.

Specifically, the confidence factor calculator 14a judges, for every event, whether the target variable value "unauthorized use" is set as a constituent element or not, and the confidence factor is calculated for an event for which the target variable value "unauthorized use" is set as a constituent element.

With respect to an event in which the confidence factor calculated by the confidence factor calculator 14a satisfies a predetermined threshold value, the high confidence factor combination selector 14b selects the combination of the explaining variable values constituting the event as the high confidence factor combination. The high confidence factor combination selector 14b corresponds to "high confidence factor combination selecting unit" in claims.

Specifically, the high confidence factor combination selector 14b selects a high confidence factor combination by using as a predetermined threshold a rate at which events having a specific target variable value as a constituent element are contained in all the events contained in the event set.

Furthermore, the high confidence factor combination selector 14b selects a high confidence factor combination from combinations of explaining variable values other than the combination of the explaining variable values constituting the pattern extracted by the pattern extracting unit 14e.

The similar event extracting unit 14c extracts from the event set a similar event similar to each event having as a constituent element the high confidence factor combination selected by the high confidence factor combination selector 14b. The similar event extracting unit 14c corresponds to "similar event extracting unit" in claims.

The weight calculator 14d calculates the weight used to generate a new combination of explaining variable values from the set of the similar events extracted by the similar event extracting unit 14c. The weight calculator 14d corresponds to "weight calculating unit" in claims.

The pattern extracting unit 14e generates a new combination of explaining variable values by using the weight calculated by the weight calculator 14d, and when the rate at which events having a specific target variable value as a constituent element are contained in all the events having the new combination of explaining variable values as constituent elements satisfies a predetermined satisfaction level, the pattern extracting unit 14e extracts the new combination of explaining variable values as a pattern.

Specifically, the pattern extracting unit 14e successively deletes the explaining variable values in the increasing order of the weight calculated by the weight calculator 14d from the combination of the explaining variable values possessed by the high confidence factor combination.

[Processing by Pattern Extracting Device]

Next, the flow of processing of the pattern extracting device 10 will be described with reference to FIG. 9. FIG. 9 is a flowchart showing the flow of processing of the pattern extracting device.

As shown in FIG. 9, when accepting the event set (YES in S1001), the pattern extracting device 10 calculates the confidence factor for every event (S1002), and execute the processing of selecting as a high confidence factor combination the combination of explaining variable values constituting an event in which the confidence factor satisfies a predetermined threshold value (S1003).

Here, when any combination of explaining variable values is not selected as the high confidence factor combination (No in S1003), the processing is finished.

On the other hand, when the combination of explaining variable values constituting an event in which the confidence factor satisfies a predetermined threshold value is selected as the high confidence factor combination (YES in S1003), the pattern extracting device 10 extracts from the event set the set of similar events similar to each event having the high confidence factor combination as a constituent element (S1004), and calculates the weight for every explaining variable value possessed by the high confidence factor combination S1005).

Subsequently, the pattern extracting device 10 generates a new combination of explaining variable values by using the calculated weight (S1006), and extracts as a pattern the combination of explaining variable values in which the rate at which events having a specific target variable value as a constituent element are contained satisfies a predetermined satisfaction factor (S1007).

Subsequently, the pattern extracting device 10 selects a high confidence factor combination that is a combination of explaining variable values other than the combination of explaining variable values constituting the pattern, and executes the processing of selecting as a high confidence factor combination the combination of explaining variable values constituting an event in which the confidence factor calculated by the confidence factor calculator 14 a satisfies a predetermined threshold value (S1003), whereby the above processing (S1003 to S1007) are repetitively executed.

[Example of Specific Processing by Pattern Extracting Device]

Next, the extraction of a merchandise purchase pattern of a user using a credit card unjustly in which the number of events is equal to 20 or more and the rate at which events having a target variable value "unauthorized use" as a constituent is equal to 75% or more is extracted will be described as an example of the processing of the pattern extracting device 10 according to the first embodiment.

(Explanation of Main Terms)

First, main terms used to explain an example of the specific processing of the pattern extracting device 10 according to the first embodiment will be described.

An event is constructed by associating a combination of explaining variable values, which represent a condition of each explaining variable, with a target variable value, which represents a condition of a target variable. For example, an event corresponds to sales data which is collected from each outlet store by POS (Point Of Sale) system every time a credit card is used. Furthermore, an event set corresponds to information containing plural events (see FIG. 2A).

The sales data are constructed by associating an item of goods sold (item of goods), the total amount of usage money (amount of money) and a monthly use frequency of a credit card (use frequency) with data ID. Furthermore, a label representing whether use of the credit card is normal or unjust is allocated in association with the data ID.

The variable is information representing a category such as an item of goods, the amount of money, frequency of use, label or the like. The label corresponds to the target variable, and the item of goods, the amount of money and the use frequency correspond to explaining variables.

The variable value is a value representing the condition of a variable and it contains a value represented by a character array (for example, "noble metal"), a numerical value (for example, "50,000 yen"), a value representing a range of the numerical values (for example, "100,000 yen to 150,000 yen"), etc.

The variable value representing the condition of the item of goods is a character array representing the name of goods (for example, "noble metal", "electrical appliance", etc.), the variable value representing the condition of the amount of money is a numerical value representing the amount of money (for example, "50,000 yen", "100,000 yen"), the variable value representing the condition of the monthly use frequency of the credit card is a numerical value representing use frequency (for example, "once", "twice"), and the variable value of the label is "normal use" or "unjust use". Here, "unjust use" corresponds to the target variable value, and "noble metal" and "electrical appliance" correspond to the explaining variable values of goods. "50,000 yen", "200,000 yen", etc. correspond to explaining variable values of the amount of money, and "once", "twice", etc. correspond to the explaining variable values of the use frequency.

In the following description, in order to simplify the description, the event set shown in FIG. 2A is paraphrased as shown in FIG. 2B. That is, the explaining variable values of the amount of money are paraphrased to "0 yen to 300,000 yen" and "300,000 yen or more" which are values representing the range of the amount of money, and the explaining variable values of the use frequency are paraphrased to l"once to thrice" and "four times or more" which are values representing the range of the use frequency.

In FIG. 2B, the number of events each of which has the combination of predetermined explaining variable values and "normal use" or "unjust use" as a constituent element is represented as a label number. For example, the label number (8, 2) corresponding to the combination of explaining variable values "electrical appliance", "0 yen to 300,000 yen" and "once to thrice" means that the event set contains eight events each of which has the explaining variable values "electrical appliance", "0 yen to 300,000 yen" and "once to thrice" and the target variable value "normal use" as constituent elements and two events of which has the explaining variable values "electrical appliance", "0 yen to 300,000 yen" and "once to thrice" and the target variable value "unjust use" as constituent elements.

(Weight and Confidence factor Calculating System)

Next, a calculation method of Memory-Based Reasoning (MBR) will be described as an example of a method of calculating an weight and a confidence factor by the pattern extracting device 10 according to the first embodiment (see JP-A-2000-155681). A part of the equation is changed to simplify the description, however, the present invention is not limited to this style.

First, the distance "d(j)" between an unknown event and a known event of each explaining variable is calculated by using equations (1-1) and (1-2) of the following equation (1). Here, the unknown event is an event as a calculation target, and the known event is an event other than the unknown event. Furthermore, "j" represents a number for identifying the explaining variable.

Furthermore, with respect the explaining variables in which a numeric value or a value representing the range of a numeric value is set as an explaining variable value, the distance is calculated by using the following equation (1-1). With respect to the explaining variable in which a value represented by a character array is set as an explaining variable value, the distance is calculated by using the equation (1-2) (for example, with respect to the item of goods, the distance between an unknown event having the explaining variable value "noble metal" as a constituent element and a known event having the explaining variable value "noble metal" as a constituent element is equal to zero, and the distance between an unknown event having the explaining variable value "electrical appliance" as a constituent element and a known event having the explaining variable value "noble metal" as a constituent element is equal to 1).

$$d_j \begin{cases} \dfrac{\text{difference of explaining variable values}}{\text{standard deviation}} - (1-1) \\ \begin{cases} 0 (\text{coincidence}) \\ 1 (\text{non-coincidence}) \end{cases} - (1-2) \end{cases} \quad (1)$$

Subsequently, the weight "w(j,v)" used to generate a new combination of explaining variable values is calculated by the following equations (2) and (3). Here, "p(c)" represents the probability that an event having an unknown event as a constituent element is contained in an area "c". "p(v|c)" represents the conditional probability that an event having a target variable value as a constituent element is contained when the explaining variable value of a j-th explaining variable is contained in an area "v". Furthermore, "N(c)" represents the number of events having an unknown event in a known event as a constituent element. The weight in the j-th explaining variable value v(j) of the unknown event is represented by "w(j(v(j)))".

$$q(v, c) = p(c|v)/p(c) \quad (2)$$

$$w(j, v) = \dfrac{\sum_c \left| \dfrac{q(v,c)}{\sum_d q(v,d)} - \dfrac{1}{N(c)} \right|}{2 - \dfrac{2}{N(c)}} \quad (3)$$

Subsequently, the inter-event distance between the unknown event and the known event is calculated by using the following equation (4). "*" represents multiplication.

$$D = \sqrt{\sum_j w(j, v(j)) * d(j)^2} \quad (4)$$

Subsequently, the similarity "S" between the unknown event and the known event is defined by the following equation (5) using the inter-event distance "D". Here, "Δ" represents a minute value for preventing the similarity from reaching an infinite value.

$$S = \dfrac{1}{D + \Delta} \quad (5)$$

Subsequently, a known event (similar event) having a high similarity with an unknown event is extracted. For example, known events of k cases indicated by a user are successively extracted in the decreasing order of similarity. The confidence factor P(c) of the unknown event is calculated by using the following equation (6).

$$P(c) = \dfrac{\text{number of events having "unjust use" as constituent element in number of events extracted as similar events}}{\text{number of events extracted as similar events}} \quad (6)$$

(Example of Specific Processing)

Next, an example of the specific processing of the pattern extracting device 10 according to the first embodiment will be described. First, when accepting an event set through the input portion 11, the pattern extracting device 10 stores the event set into the event set storage unit 13a (see FIG. 2) (corresponding to "YES" of S1001 shown in FIG. 9).

Subsequently, the pattern extracting device 10 calculates, for every event, a confidence factor representing the degree of reliability indicating that events having a target variable value "unjust use" as a constituent element are contained in all events having the combination of predetermined explaining variable values as a constituent element (corresponding to S1002 shown in FIG. 9). Specifically, the confidence factor calculator 14a judges, for every event, whether the target variable "unjust use" is set as a constituent element, and calculates the confidence factor by using the equations (1) to (6) for events which are judged to have the target variable value "unjust use" as a constituent element, and stores the combination of the predetermined explaining variable values, the label number and the confidence factor in the confidence factor storage unit 13b while they are associated with one another (see FIG. 3).

The weight of the explaining variable value "electrical appliance" calculated by using the equations (2) and (3) is equal to "0.025", the weight of the explaining variable value "noble metal" is equal to "0.025", the weight of the explaining variable value "0 yen to 300,000 yen" is equal to "0.182", the weight of the explaining variable value "300,000 yen or more" is equal to "0.174", the weight of the explaining variable value "once to thrice" is equal to "10.235", and the weight of the explaining variable value "fourth time or more" is equal to "0.222" (see FIG. 6A).

The table of FIG. 3 shows the confidence factor when each event having the target variable value "unjust use" as a constituent element is set as an unknown event and the number "k" of extracted events is set to 20. Here, when the confidence factor of an event having the combination of the explaining variable values "electrical appliance", "0 yen to 300,000 yen" and "once to thrice" and the target variable value "unjust use" as a constituent element is calculated (see (1) of FIG. 3), each event having the combination of the explaining variable values "0 yen to 300,000 yen" and "once to thrice" as a constituent element (see (1) and (5) of FIG. 3) corresponds to a similar event.

Furthermore, when the confidence factor of an event having the combination of the explaining variable values "electrical appliance", "0 yen to 300,000 yen" and "four times or more" and the target variable value "unjust use" as a constituent element is calculated (see (2) of FIG. 3, each event having the combination of the explaining variable values "0 yen to 300,000 yen" and "four times or more" as a constituent element (see (2) and (6) of FIG. 3) corresponds to a similar event.

Likewise, when the confidence factor of (4) of FIG. 3 is calculated, (4) and (8) of FIG. 3 correspond to similar events. When the confidence factor of (5) of FIG. 3 is calculated, (1) and (5) of FIG. 3 correspond to similar events. When the confidence factor of (7) of FIG. 3 is calculated, (3) and (7) of FIG. 3 correspond to similar events. When the confidence factor of (8) of FIG. 3 is calculated, (4) and (8) of FIG. 3 correspond to similar events. With respect to (3) and (6) of FIG. 3, there is no event having the target variable value "unjust use" as a constituent element, and thus no confidence factor is calculated.

Subsequently, with respect to an event in which the confidence factor calculated by the confidence factor calculator 14a is calculated satisfies a predetermined threshold value, the pattern extracting device 10 selects the combination of explaining variable values constituting the event as a high confidence factor combination (corresponding to "YES" of S1003 shown in FIG. 9).

Specifically, the high confidence factor combination selector 14b selects the high confidence factor combination while the rate at which events having a specific target variable value as a constituent element are contained in all the events contained in the event set is set as a predetermined threshold value. The high confidence factor combination selector 14b associates the selected high confidence factor combination, the label number and the confidence factor with one another and stores them into the high confidence factor combination storage unit 13c.

In this example, thirty five events each of which has the target variable value "unjust use" as a constituent element are contained in the event set. The high confidence factor combination selector 14b selects combinations of explaining variable values having confidence factors which are not less than a value obtained by dividing the number of events having the target variable value "unjust use" as a constituent element by the number of the events contained in the event set (that is, "35/80=0.4375", and stores the selected combinations into the high confidence factor combination storage unit 13c (see FIG. 4A).

Subsequently, with respect to the selected high confidence factor combinations, the pattern extracting device 10 successively executes pattern extracting processing on the selected high confidence factor combinations in the decreasing order of the confidence factor (the S1004 to the S1007 shown in FIG. 9). In the following description, it is assumed that the pattern extracting processing is executed from the combination of the explaining variable values "noble metal", "300,000 yen or more" and "four times or more".

First, the pattern extracting device 10 extracts from the event set similar events which are similar to each event having as a constituent element the high confidence factor combination selected by the high confidence factor combination selector 14b (corresponding to the S1004 shown in FIG. 9).

Specifically, by using the equations (1) to (5), the similar event extracting unit 14c extracts similar events when the event having the explaining variable values "noble metal", "300,000 yen or more" and "four times or more" and the target variable value "unjust use" as a constituent element are set as an unknown event. Here, it is assumed that the similar event extracting unit 14c extracts similar events while the number "k" of events to be extracted is set to 40 and the weight "w(j,v)" is set to 1 without using the weight "w(j,v)" calculated by the equation (2).

The similar event extracting unit 14c stores the combination of the explaining values constituting the extracted similar event and the label number with each other and stores them into the similar event storage unit 13d (see FIG. 5A).

Subsequently, the pattern extracting device 10 calculates an weight used to generate a new combination of explaining variable value from the set of the similar events extracted by the similar event extracting unit 14c for every explaining variable value possessed by the high confidence factor combination (corresponding to the S1005 shown in FIG. 9). Specifically, the weight calculator 14d calculates the weight of the explaining variable value "noble metal", the weight of the explaining variable value "300,000 yen or more" and the weight of the explaining variable value "four times or more" from the set of the similar events extracted by the similar event extracting unit 14c by using the equation (2), and stores each explaining variable value and the weight of each explaining variable value into the weight storage unit 13e in association with each other.

Here, the weight of the explaining variable value "noble metal" calculated by the weight calculator 14d is equal to "0.05", and the weight of the explaining variable value "300,000 yen or more" is equal to "0.357". The weight of the explaining variable value "four times or more" calculated by the weight calculator 14d is equal to "0.249", however, it is judged that the number of events having the explaining variable value "four times or more" as a constituent element is smaller than the number of events having the explaining variable value "once to thrice" in each event contained in the set of the similar events, and they are stored in the weight storage unit 13e while inverting the positive and negative signs (see FIG. 6B).

Subsequently, the pattern extracting device 10 generates a new combination of explaining variable values (in the following description, it is referred to as "new combination") by using the weight calculated by the weight calculator 14d (corresponding to the S1006 shown in FIG. 9).

Specifically, the pattern extracting unit 14e deletes the explaining variable value "four times or more" having the smallest weight among the weight of the explaining variable value "noble metal", the weight of the explaining variable value "300,000 yen or more" and the weight of the explaining variable value "four times or more" calculated by the weight calculator 14d from the combination of the explaining variable values "noble metal", "300,000 yen or more" and "four times or more" possessed by the high confidence factor combination, whereby the combination of the explaining variable values "noble metal" and the "300,000 yen or more" is generated as a new combination. Then, the pattern extracting unit 14e stores the new combination into the new combination storage unit 13f (see FIG. 7A).

Subsequently, the pattern extracting device 10 extracts the new combination as a pattern when the rate at which events having the target variable value "unjust use" as a constituent element are contained in all the events having the new combination as a constituent element satisfies a predetermined satisfaction level (corresponding to the S1007 shown in FIG. 9).

Specifically, the pattern extracting unit 14e measures the number (20) of events having the combination of the explaining variable value "noble metal" and "300,000 yen or more" as a constituent element is measured from the event set, and also the number (15) of events having the explaining variable values "noble metal" and "300,000 yen" and the target variable value "unjust use" as a constituent element is measured.

The pattern extracting unit 14e divides the number of the events having the explaining variable values "noble metal" and "300,000 yen or more" and the target variable value "unjust use" as a constituent element by the number of events having the combination of the explaining variable values "noble metal" and "300,000 yen or more" as a constituent element (that is, $15/20=75\%$), thereby calculating the rate at which the events having the target variable value "unjust use" as a constituent element are contained in all the events having the new combination as a constituent element.

Furthermore, the pattern extracting unit 14e judges that the number of events having the target variable value "unjust use"

as a constituent element is equal to 20 or more and the rate at which the events having the target variable value "unjust use" as a constituent element are contained is equal to 75% or more, and extracts the combination of the explaining variable values "noble metal" and "300,000 yen or more" as a pattern. Then, the pattern extracting unit 14e stores the combination of the explaining variable values "noble metal" and "300,000 yen or more" extracted as a pattern into the pattern storage unit 13g (see FIG. 8A).

Subsequently, with respect to an event which is the combination of explaining variable values other than the combination of the explaining variable values constituting the pattern extracted by the pattern extracting unit 14e and in which the confidence factor calculated by the confidence factor calculator 14a the pattern extracting device 10 satisfies a predetermined threshold value, the pattern extracting device 10 the combination of the explaining variable values constituting the event concerned as a high confidence factor combination (corresponding to "YES" of the S1003 shown in FIG. 9).

Specifically, with respect to an event which is the combination of explaining variable values other than the combination of the explaining variable value extracted by the pattern extracting unit 14e and has a confidence factor above the rate at which contains having a specific target variable value as a constituent element are contained in all the events contained in the event set, the high confidence factor combination selector 14b selects the combination of the explaining variable value constituting the event concerned as a high confidence factor combination. The high confidence factor combination selector 14b associates the selected high confidence factor combination, the label number and the confidence factor with one another and stores them into the high confidence factor combination storage unit 13c to renew the high confidence factor combination storage unit 13c.

In this example, the high confidence factor combination selector 14b selects the combination of explaining variable values "electrical appliance", "0 yen to 300,000 yen" and "four times or more" which is a combination of explaining variable value other than the combination of the explaining variable value extracted by the pattern extracting unit 14e, and also the combination of explaining variable values "electrical appliance", "300,000 yen or more" and "four times or more", and stores the selected combinations into the high confidence factor combination storage unit 13c to renew the high confidence factor combination storage unit 13c (see FIG. 4B).

Subsequently, the pattern extracting device 10 extracts from the event set similar events which are similar to each event having each high confidence factor combination having the highest confidence factor as a constituent element among the respective high confidence factor combinations selected by the high confidence factor combination selector 14b (corresponding to the S1004 shown in FIG. 9).

Specifically, by using the equations (1) to (5), the similar event extracting unit 14c extracts similar events when an event having the combination of the explaining variable values "electrical appliance", "0 yen to 300,000 yen" and "four times or more" selected by the high confidence factor combination selector 14b and the target variable value "unjust use" as a constituent element is set as an unknown event.

In this case, as in the case of the processing of extracting the similar events when an event having the combination of the explaining variable values "noble metal", "300,000 yen or more" and "four times or more" and the target variable value "unjust use" as a constituent element is set as an unknown event, it is assumed that the similar event extracting unit 14c extracts a similar event while the number "k" of events to be extracted is set to 40 and the weight "w(j,v)" is set to 1 without using the weight "w(j,v)" calculated by the equation (2).

The similar event extracting unit 14c stores the combination of the explaining variable values constituting the extracted similar event and the label number in association with each other in the similar event storage unit 13d to renew the similar event storage unit 13d (see FIG. 5B).

Subsequently, the pattern extracting device 10 calculates the weight used to generate a new combination of explaining variable values from the set of the similar events extracted by the similar event extracting unit 14c for every explaining variable value possessed by the high confidence factor combination (corresponding to the S1005 shown in FIG. 9). Specifically, the weight calculator 14d calculates the weight of the explaining variable value "electrical appliance", the weight of the explaining variable value "300,000 yen or more" and the weight of the explaining variable value "four times or more" from the set of the similar events extracted by the similar event extracting unit 14c according to the equation (2), and stores each explaining variable value and the weight of each explaining variable value in association with each other in the weight storage unit 13e.

Here, the weight of the explaining variable value "electrical appliance" calculated by the weight calculator 14d is equal to "0.034", and the weight of the explaining variable value "four times or more" is equal to "0.384". The weight of the explaining variable value "300,000 yen or more" calculated by the weight calculator 14d is equal to "0.294". However, it is judged that the number of events having the explaining variable value "300,000 yen or more" as a constituent element is smaller than the number of events having the explaining variable value "0 yen to 300,000 yen" as a constituent element in each event contained in the set of the similar events, and they are stored in the weight storage unit 13e while the positive and negative signs are inverted (see FIG. 6C).

Subsequently, the pattern extracting device 10 generates a new combination by using the weight which is calculated by the weight calculator 14d (corresponding to the S1006 shown in FIG. 9).

Specifically, the pattern extracting unit 14e deletes the explaining variable value "300,000 yen or more" having the smallest weight among the explaining variable value "electrical appliance", the weight "300,000 yen or more" and the weight of the explaining variable value "four times or more" calculated by the weight calculator 14d from the combination of the explaining variable values "electrical appliance", "1300,000 yen or more" and "four times or more" possessed by the higher confidence factor combination, thereby generating the combination of the explaining variable values "electrical appliance" and "four times or more" as a new combination. The pattern extracting unit 14e stores the new combination into the new combination storage unit 13f, and renews the new combination storage unit 13f (see FIG. 7B).

Subsequently, the pattern extracting device 10 extracts the new combination as a pattern when the rate at which events having the target variable value "unjust use" as a constituting element are contained in all the events having the new combination as a constituent element satisfies a predetermined satisfaction level (corresponding to the S1007 shown in FIG. 9).

Specifically, the pattern extracting unit 14e measures the number (20) of events having the combination of the explaining variable values "electrical appliance" and "four times or more" as a constituent element from the event set, and also measures the number (16) of events having the combination of the explaining variable values "electrical appliance" and "four times or more" and the target variable value "unjust use" as a constituent element.

The pattern extracting unit 14e divides the number of the events having the combination of the explaining variable values "electrical appliance" and "four times or more" and the target variable value "unjust use" as a constituent element by the number of the events having the combination of the explaining variable values "electrical appliance" and "four times or more" as a constituent element (that is, 16/20=80%), thereby calculating the rate at which the events having "unjust use" as a constituent element are contained in all the events having the new combination as a constituent element.

Furthermore, the pattern extracting unit 14e judges that the number of the events having the target variable value "unjust use" as a constituent element is equal to 20 or more and the rate at which the events having the target variable value "unjust use" as a constituent element is equal to 75%, and extracts the combination of the explaining variable values "electrical appliance" and "four times or more" as a pattern. The pattern extracting unit 14e additionally stores the combination of the explaining variable value "electrical appliance" and "four times or more" extracted as a pattern into the pattern storage unit 13g (see FIG. 8B).

Subsequently, with respect to an event which is the combination of explaining variable values other than the combination of the explaining variable values as the high confidence factor combination extracted by the pattern extracting unit 14e and in which the confidence factor calculated by the confidence factor calculator 14a satisfies a predetermined threshold value, the pattern extracting device 10 executes the processing of selecting the combination of the explaining variable values constituting the event concerned as a high confidence factor combination, however, the processing is finished without selecting any combination of explaining variable values as a high confidence factor combination (corresponding to "NO" of the S1003 shown in FIG. 9).

Effect of First Embodiment

As described above, according to the first embodiment, the pattern of a target variable value which is contained as a constituting element at a small rate can be easily extracted. Furthermore, according to the first embodiment, the pattern of a target variable value which is contained as a constituent element at a small rate can be extracted at high speed.

Still furthermore, according to the first embodiment, the pattern of a target variable value which is contained as a constituent element at a small rate can be extracted without extracting any duplicated pattern.

Still furthermore, according to the first embodiment, many patterns of target variable values having small rates can be extracted.

Second Embodiment

When a merchandise purchase pattern of a user who unjustly uses a credit card in which the number of events is equal to 10 or more and the rate at which events having the target variable value "unjust use" as a constituent element are contained is equal to 75% or more is extracted, the combination of the explaining variable values "electrical appliance", "0 yen to 300,000 yen" and "four times or more" and the combination of the explaining variable values "noble metal", "300,000 yen or more" and "once to thrice" may be extracted as a pattern in the high confidence factor combination selected by the high confidence factor combination selector 14b.

Therefore, in this second embodiment, there will be described a case where the combination of explaining variable values selected as a high confidence factor combination is extracted when the rate at which events having a specific target variable value as a constituent element are contained in all events having a high confidence factor combination as a constituent element satisfies a predetermined satisfaction level. In the second embodiment, the construction of the pattern extracting device according to the second embodiment and the flow of processing of the pattern extracting device will be first described, and then the effect of the second embodiment will be described.

[Construction of Pattern Extracting Device]

The construction of the pattern extracting device 10 according to the second embodiment is different from the pattern extracting device 10 according to the first embodiment in the following point.

That is, when the rate at which events having a specific target variable value as a constituent element are contained in all events having a high confidence factor combination selected by the high confidence factor combination selecting unit 14b satisfies a predetermined satisfaction rate, the pattern extracting unit 14e extracts the combination of the explaining variable values selected as the high confidence factor combination as a pattern.

Specifically, the pattern extracting unit 14e measures the number (6) of events having the combination of the explaining variable values "noble metal", "300,000 yen or more" and "four times or more" as a constituent element from the event set, and also measures the number (10) of events having the combination of the explaining variable values "noble metal", "300,000 yen or more" and "four times or more" and the target variable value "unjust use" as a constituent element.

The pattern extracting unit 14e divides the number of the events having the combination of the explaining variable values "noble metal", "300,000 yen or more" and "four times or more" and the target variable value "unjust use" as a constituent element by the number of the events having the combination of the explaining variable values "noble metal", "300,000 yen or more" and "four times or more" (that is, 6/10=60%), thereby calculating the rate at which the events having the target variable value "unjust use" as a constituent element are contained in all the events having the combination of the explaining variable values "noble metal", "300,000 yen or more" and "four times or more" as a constituent element.

Furthermore, the pattern extracting unit 14e judges that the number of events having the target variable value "unjust use" as a constituent element is equal to 10 or more and the rate at which events having the target variable value "unjust use" as a constituent element are contained is less than 75%, and ceases the pattern extraction processing of the combination of the explaining variable values "noble metal", "300,000 yen or more" and "four times or more".

Subsequently, the pattern extracting unit 14e executes the pattern extraction processing of the combination of the explaining variable values "electric appliance", "300,000 yen or more" and "four times". Here, as in the case of the pattern extraction processing of the combination of the explaining variable values "noble metal", "300,000 yen or more" and "four times or more", the pattern extracting unit 14e judges that the rate at which events having the target variable value "unjust use" as a constituent element are contained is less than 75%, and ceases the pattern extraction processing of the combination of the explaining variable values "electrical appliance", "300,000 yen or more" and "four times or more".

Subsequently, the pattern extracting unit 14e executes the pattern extraction processing of the combination of the explaining variable values "electrical appliance", "0 yen to 300,000 yen" and "four times or more". Here, the pattern extracting unit 14e judges that the number of events having the target variable value "unjust use" as a constituent element is equal to 10 or more and the rate at which the events having the target variable "unjust use" as a constituent element are contained is equal to 75% or more, and extracts the combination of the explaining variable values "electrical appliance", "0 yen to 300,000 yen" and "four times or more" as a pattern. Then, the pattern extracting unit 14e stores the combination of the explaining variable values "electrical appliance", "0 yen to 300,000 yen" and "four times or more" extracted as the pattern into the pattern storage unit 13g.

Subsequently, the pattern extracting unit 14e executes the pattern extraction processing of the combination of the explaining variable values "noble metal", "300,000 yen or more" and "once to thrice". Here, the pattern extracting unit 14e judges that the number of events having the target variable value "unjust use" as a constituent element is equal to 10 or more and the rate at which events having the target variable value "unjust use" as a constituent element are contained is equal to 75% or more, and extracts the combination of the explaining variable values "noble metal", "300,000 yen or more" and "once to thrice" as a pattern. Then, the pattern extracting unit 14e additionally stores the combination of the explaining variable values "noble metal", "300,000 yen or more" and "once to thrice" extracted as the pattern into the pattern storage unit 13g.

[Processing of Pattern Extracting Device]

Figure 10:
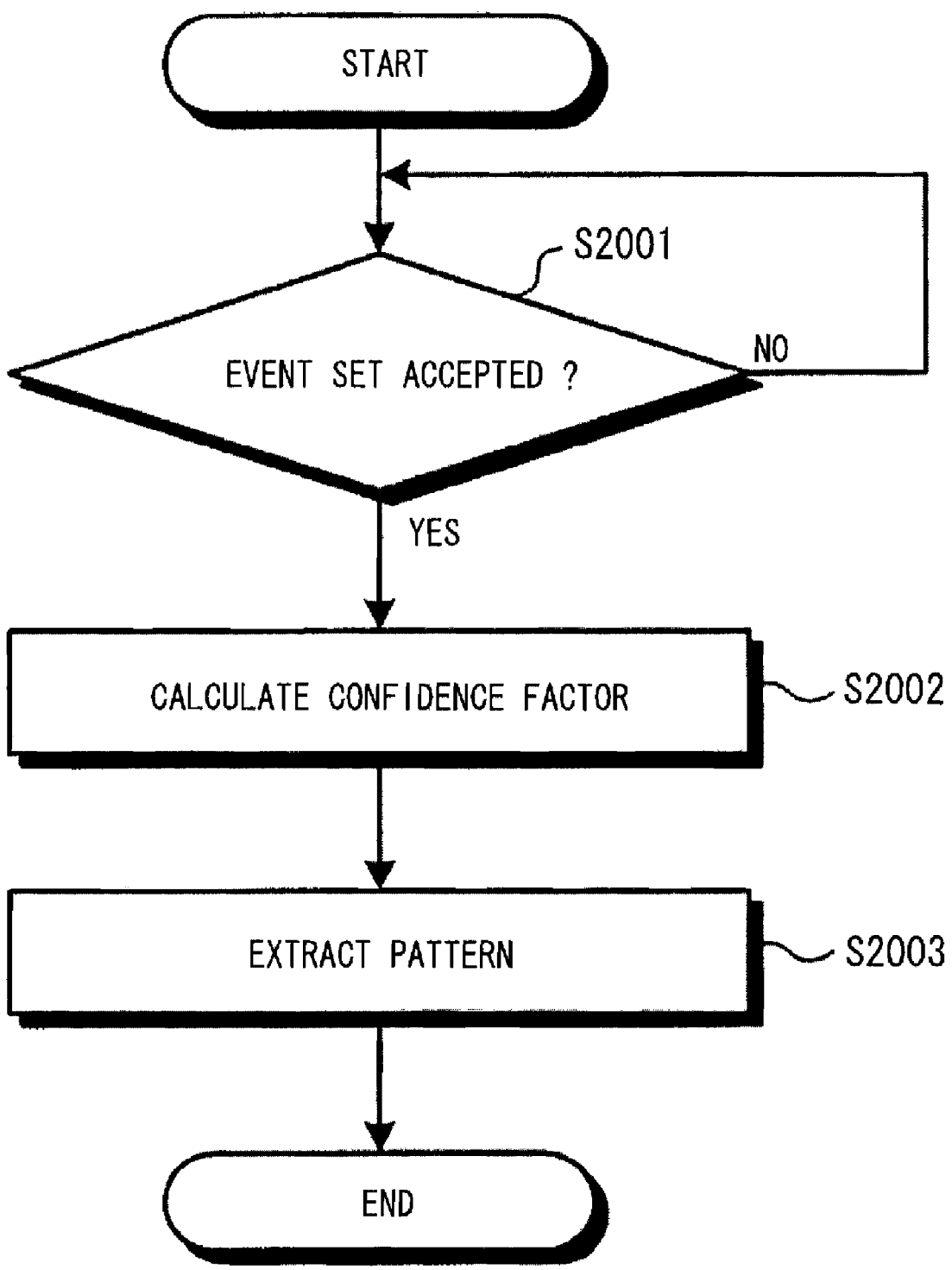
FIG. 10 is a flowchart showing the flow of processing by a pattern extracting device according to a second embodiment.

Next, the flow of the processing of the pattern extracting device 10 will be described with reference to FIG. 10. FIG. 10 is a flowchart showing the flow of the processing of the pattern extracting device according to the second embodiment.

As shown in FIG. 10, when accepting an event set (YES in S2001), the pattern extracting device 10 calculates the confidence factor for every event (S2002), extracts as a pattern the combination of explaining variable values in which the rate at which events having a specific target variable value as a constituent element are contained satisfies a predetermined satisfaction level (S2003), and then finishes the processing.

Effect of Second Embodiment

As described above according to the second embodiment, the pattern of a target variable value which is contained as a constituent element at a small rate can be extracted by a simple construction.

Third Embodiment

The confidence factor may be calculated by using each event which does not have the explaining variable values extracted by the pattern extracting unit 14e as a constituent element.

In the third embodiment, there will be described a case where the confidence factor is calculated by using each event which does not use as a constituent element the combination of the explaining variable values extracted by the pattern extracting unit 14e. In the third embodiment, the construction of the pattern extracting device according to the third embodiment and the flow of the processing of the pattern extracting device will be first described, and then the effect of the third embodiment will be described.

[Construction of Pattern Extracting Device]

The construction of the pattern extracting device 10 according to the third embodiment is different from the pattern extracting device 10 according to the first embodiment in the following point.

That is, the confidence factor calculator 14a calculates the confidence factor by using each event which does not use as a constituent element the combination of explaining variable values extracted by the pattern extracting unit 14e.

Specifically, the confidence factor calculator 14a deletes the combination of the explaining variable values "noble metal" and "300,000 yen or more" extracted by the pattern extracting unit 14e from the event set storage unit 13a to renew the event set storage unit 13a (see FIG. 11). FIG. 11 is a diagram showing an example of information stored in the event set storage unit according to the third embodiment.

The confidence factor calculator 14a judges, for every event, whether the target variable value "unjust use" is set as a constituent element, and with respect to events which are judged to have the target variable value "unjust use" as a constituent element, the confidence factor calculator 14a calculates the confidence factors thereof by using the equations (1) to (6), and stores the combination of predetermined explaining variable values, the label number and the confidence factor in association with one another in the confidence factor storage unit 13b (see FIG. 12). FIG. 12 is a diagram showing an example of the information stored in the confidence factor storage unit according to the third embodiment.

The weight of the explaining variable value "electrical appliance" calculated by using the equations (2) and (3) is equal to "0.241", the weight of explaining variable value "novel metal" is equal to "0.636", the weight of the explaining variable value "0 yen to 300,000 yen" is equal to "0.037", the weight of the explaining variable value "300,000 yen or more" is equal to "0.077", the weight of the explaining variable value "once to thrice" is equal to "0.529" and the weight of the explaining variable value "four times or more" is equal to "0.391" (see FIG. 13). FIG. 13 is a diagram showing an example of information stored in the weight storing unit according to the third embodiment.

Furthermore, the example of FIG. 12 indicates the confidence factor when each event having the target variable value "unjust use" as a constituent element is set as an unknown event and the number "k" of events to be extracted is set to 20. Here, when the confidence factor of an event having the combination of the explaining variable values "electrical appliance", "0 yen to 300,000 yen" and "once to thrice" and the target variable value "unjust use" as a constituent element is calculated (see (1) of FIG. 12), each event having the combination of the explaining variable values "electrical appliance" and "once to thrice" as a constituent element (see (1) and (3) of FIG. 12) corresponds to a similar event.

Furthermore, when the confidence factor of an event having the combination of the explaining variable values "electrical appliance", "0 yen to 300,000 yen" and "four times or more" and the target variable value "unjust use" as a constituent element is calculated (see (2) of FIG. 12), each event having the combination of the explaining variable value "electrical appliance" and "four times or more" as a constituent element (see (2) and (4) of FIG. 12) corresponds to a similar event.

Likewise, when the confidence factor of (4) of FIG. 12 is calculated, (2) and (4) of FIG. 12 correspond to similar events, and when the confidence factor of (5) of FIG. 12 is calculated, (5) and (6) of FIG. 12 correspond to similar events. With respect to (3) and (6) of FIG. 12, there is no event having the target variable value "unjust use" as a constituent element, and thus no confidence factor is calculated.

Subsequently, with respect to an event in which the confidence factor calculated by the confidence factor calculator 14a satisfies a predetermined threshold value, the pattern extracting device 10 selects the combination of explaining variable values constituting the event concerned as a high confidence factor combination.

In this example, twenty events each of which has the target variable value "unjust use" as a constituent element are contained in the event set, and the high confidence factor combination selector 14b selects combinations of explaining variable values whose confidence factors are not less than the value obtained by dividing the number of events having the target variable value "unjust use" as a constituent element by the number of events contained in the event set (that is, "20/60=0.3333"), and stores them into the high confidence factor combination storage unit 13c (see FIG. 14). FIG. 14 is a diagram showing an example of information stored in the high confidence factor combination storage unit according to the third embodiment.

[Processing of Pattern Extracting Device]

Figure 15:
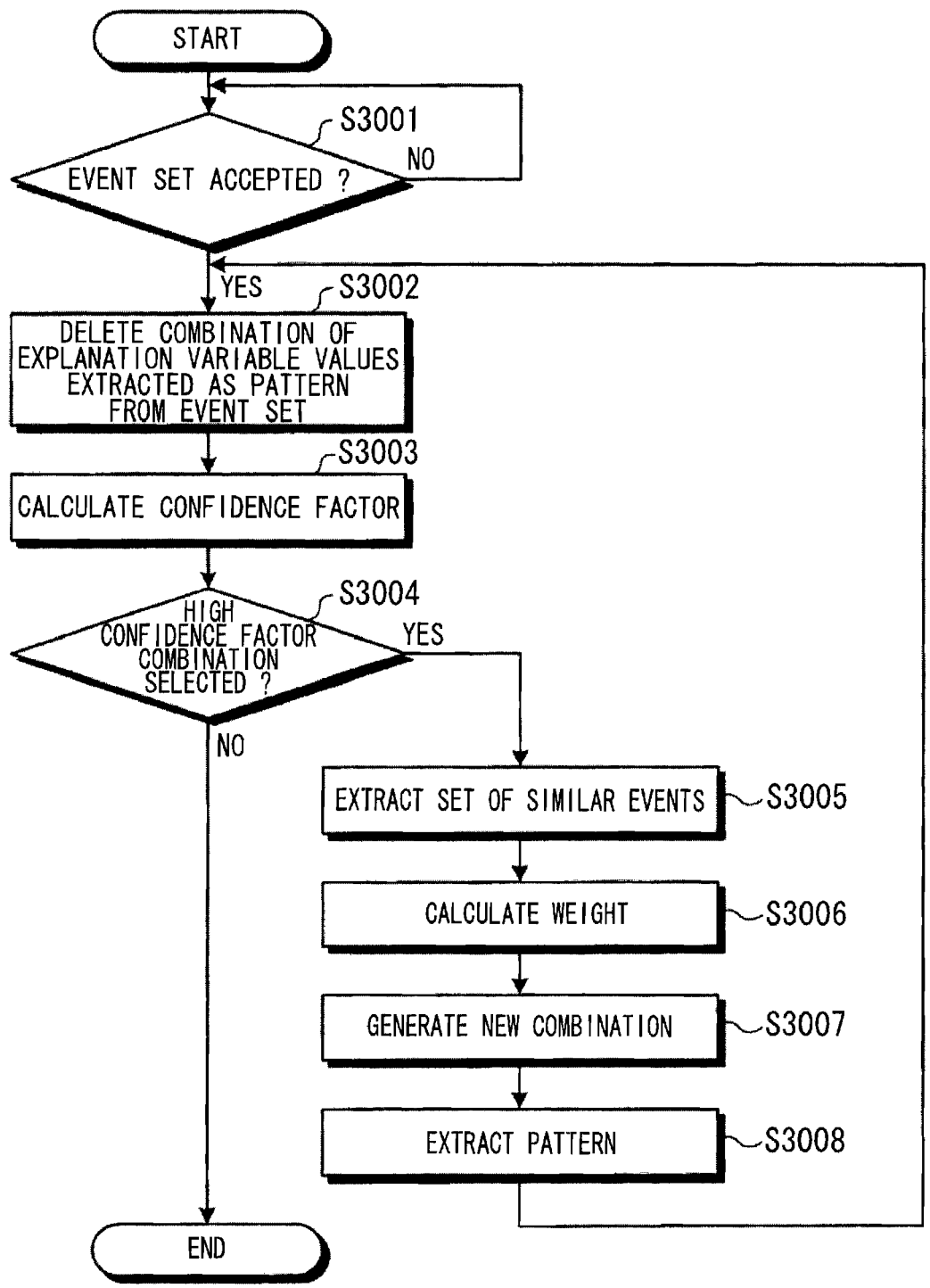
FIG. 15 is a flowchart showing the flow of processing by a pattern extracting device according to the third embodiment.

Next, the flow of processing of the pattern extracting device 10 will be described with reference to FIG. 15. FIG. 15 is a flowchart showing the flow of processing of the pattern extracting device according to the third embodiment. Only the different point from the flow of the processing of the pattern extracting device 10 according to the first embodiment will be described in detail.

As shown in FIG. 15, when accepting an event set ("YES" of S3001), the pattern extracting device 10 executes the processing of deleting the combination of the explaining variable values extracted as a pattern from the event set (S3002), calculating the confidence factor for every event (S3003) and selecting as the high confidence factor combination ("YES" of the S3004).

Subsequently, the pattern extracting device 10 executes the pattern extraction processing (S3005 to S3008), and deletes the explaining variable values extracted as the pattern from the event set again (S3002). The processing described above (S3002 to S3008) is repetitively executed until any combination of explaining variable values is not selected as a high confidence factor combination ("NO" of S3004).

Effect of Third Embodiment

As described above, according to the third embodiment, various patterns can be extracted as patterns of target variable values which are contained as constituent elements at a small rate.

Fourth Embodiment

In the first embodiment, the weight is calculated from the set of the similar events extracted by the similar event extracting unit 14c. However, the present invention is not limited to this embodiment. The weight used to generate a new combination of explaining variable values may be calculated for every explaining variable value possessed by the high confidence factor combination selected by the high confidence factor combination selector 14b.

Therefore, in the fourth embodiment, the weight used to generate a new combination of explaining variable values for every explaining variable value possessed by the high confidence factor combination selected by the high confidence factor combination selector 14b. In the fourth embodiment, the construction of the pattern extracting device according to the fourth embodiment and the flow of processing of the pattern extracting device will be first described, and then the effect of the fourth embodiment will be described.

[Construction of Pattern Extracting Device]

The construction of the pattern extracting device 10 according to the fourth embodiment is different from the pattern extracting device 10 according to the first embodiment in the following point.

That is, the weight calculator 14d calculates the weight used to generate a new combination of explaining variable values for every explaining variable value possessed by the high confidence factor combination selected by the high confidence factor combination selector 14b.

[Processing of Pattern Extracting Device]

Figure 16:
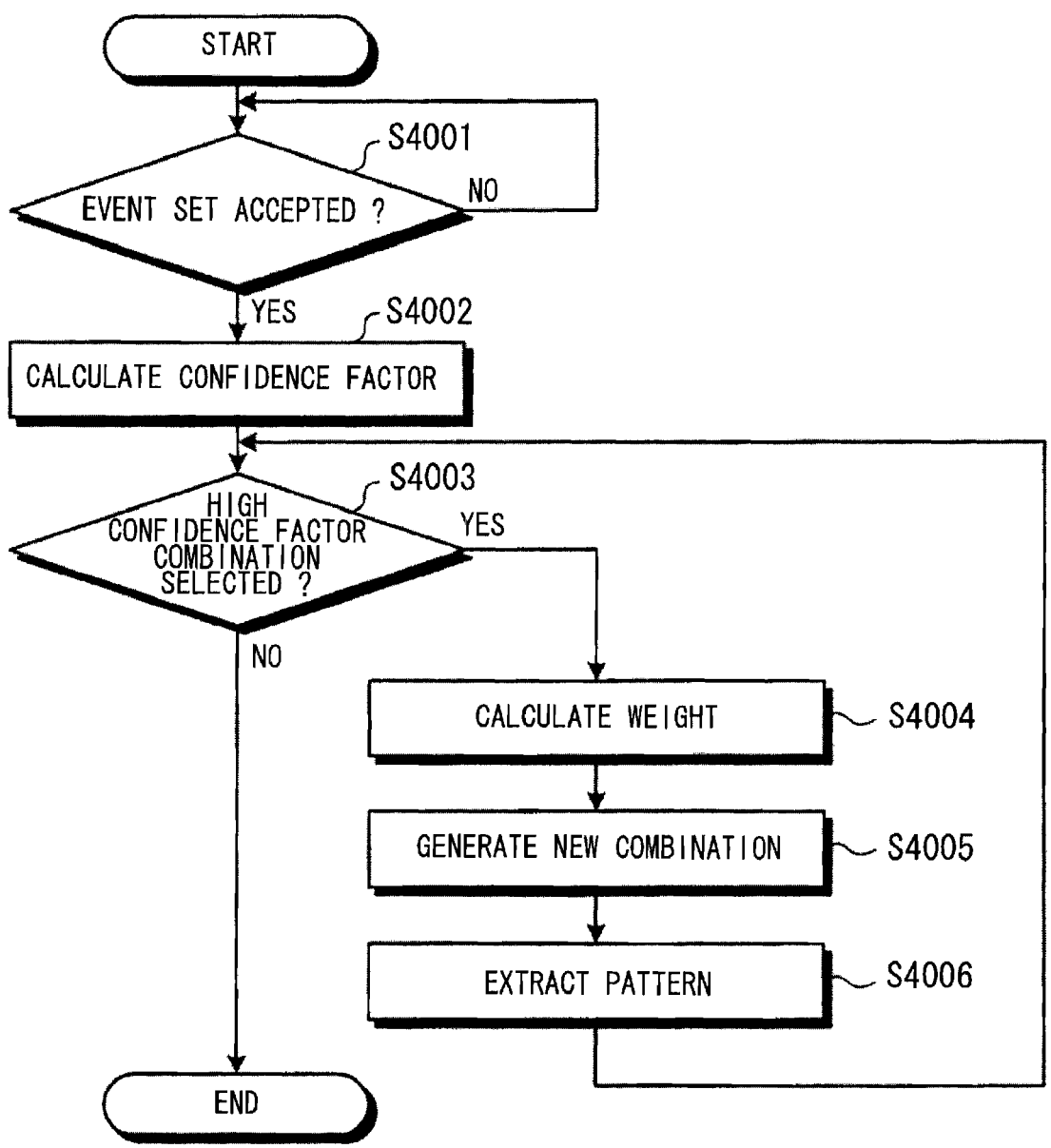
FIG. 16 is a flowchart showing the flow of processing by a pattern extracting device according to a fourth embodiment.

Next, the flow of processing of the pattern extracting device 10 will be described with reference to FIG. 16. FIG. 16 is a flowchart showing the flow of the processing of the pattern extracting device according to the fourth embodiment. Only the different point from the flow of the processing of the pattern extracting device 10 according to the first embodiment will be described in detail.

As shown in FIG. 16, when accepting the event set ("YES" of the S4001), the pattern extracting device 10 executes the processing of calculating the confidence factor for every event (S4002) and selecting it as a high confidence factor combination (S4003).

Subsequently, the pattern extracting device 10 calculates the weight used to generate a new combination of explaining variable values for every explaining variable value possessed by the high confidence factor combination selected by the high confidence factor combination selector 14b (S4004), and executes the pattern extraction processing (the S4005 to the S4006). The above processing (the S4003 to the S4006) is repetitively executed until any combination of explaining variable values is not selected as the high confidence factor combination ("NO" of the S4003").

Effect of Fourth Embodiment

As described above, according to the fourth embodiment, a pattern having a target variable value which is contained as a constituent element at a small rate can be extracted by a simple construction.

Fifth Embodiment

The first to fourth embodiment have been described above, however, the present invention may be implemented in various different styles. Therefore, another embodiment will be described as a fifth embodiment.

With respect to each explaining variable value indicating the range of a numerical value as a condition possessed by the high confidence factor combination, the range of the numerical value indicated by the explaining variable value is enlarged and changed to the range of the numerical value having the highest rate at which events having a specific target variable value as a constituent element are contained, thereby generating a new combination of explaining variable values.

For example, when the combination of the explaining variable values "noble metal", "300,000 yen or more" and "four times or more" is selected by the high confidence factor combination selector 14b, the combination of the explaining variable values "noble metal", "300,000 yen or more" and "thrice or more", the combination of the explaining variable values "noble metal", "300,000 yen or more" and "twice or more" and the combination of the explaining variable values "noble metal", "300,000 yen or more" and "once or more" may be generated new combinations of explaining variable values.

By this setting, a larger number of patterns can be extracted as patterns of target variable values which are contained as constituent elements at a small rate.

Furthermore, a new combination of explaining variable values may be generated by adding the explaining variable values in the decreasing order of the weight calculated by the weight calculator 14d.

Still furthermore, the whole or a part of the processing which is described to be automatically executed may be manually executed, or the whole or a part of the processing which is described to be manually executed may be automatically executed by a well-known method.

For example, in the first embodiment, the rate at which events having a specific target variable value as a constituent element are contained in all events contained in an event set is set as the predetermined threshold value to select the high confidence factor combination. However, the present invention is not limited to this embodiment. A threshold value for selecting a high confidence factor combination may be accepted from a user through the input unit 11, and the high confidence factor combination may be selected by using the threshold value for selecting this high confidence factor combination.

The processing procedure, the control procedure, the specific names, information containing various kinds of data and parameters (for example, the storage information shown in FIGS. 2A to 8B and FIGS. 11 to 14, the satisfaction level for judging whether the combination of explaining variable values selected as a high confidence factor combination is extracted as a pattern) may be arbitrarily changed except for a case where specifically described.

Furthermore, each constituent element of the pattern extracting device 10 shown in FIG. 1 is functionally conceptual, and it is not necessarily required to be physically constructed as shown in FIG. 1. That is, the specific style of the dispersion/integration of each device is not limited to those shown in the figures, and the whole or a part thereof may be functionally or physically dispersed/integrated in any unit in accordance with each kind of load or use status.

For example, the similar event extracting unit 14c, the weight calculator 14d and the pattern extracting unit 14e shown in FIG. 1 may be integrated. A constituent element having the function of generating a new combination of explaining variable values may be separated from the pattern extracting unit 14e.

Furthermore, with respect to each processing function executed by the pattern extracting device 10, the whole or any part thereof is implemented by CPU and a program which is analyzed and executed by the CPU concerned, or implemented as hardware based on wired logic.

Figure 17:
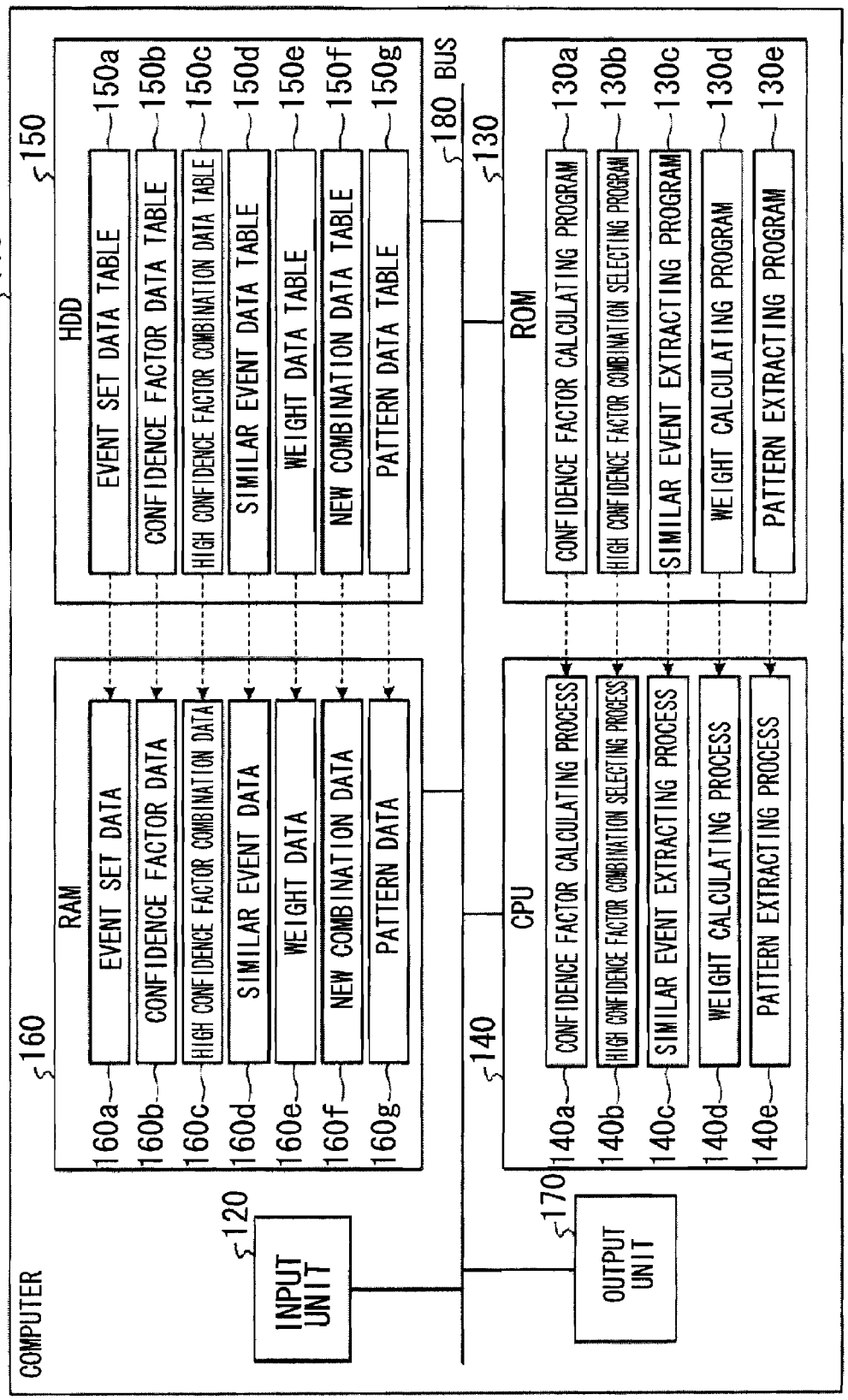
FIG. 17 is a diagram showing a computer executing a pattern extraction program.

Each processing function executed by the pattern extracting device 10 may be implemented by a program executed by a computer as the pattern extracting device 10. Therefore, in the following description, a computer for executing the pattern extraction having the same function as the pattern extracting device 10 shown in the above embodiment will be described as an example with reference to FIG. 17. FIG. 17 is a diagram showing the computer for executing a pattern extracting program.

As shown in FIG. 17, a computer 110 as the pattern extracting device 10 is constructed by an input unit 120, ROM 130, CPU 140 (e.g., hardware logic circuitry based computer processor that processes instructions, namely software), HDD 150, RAM 160 and an output unit 170 which are connected to one another through a bus 180.

In ROM 130 are beforehand stored a pattern extraction program executing the same function as the pattern extracting device 10 according to the first embodiment, that is, a confidence factor calculating program 130a, a high confidence factor combination selecting program 130b, a similar event extracting program 130c, an weight calculating program 130d and a pattern extraction program 130e as shown in FIG. 17. These programs 130a to 130e may be properly integrated or dispersed as in the case of the respective constituent elements of the pattern extracting device 10 shown in FIG. 1.

CPU 140 reads out and executes the programs 130a to 130e from ROM 130, whereby the programs 130a to 130e function as a confidence factor calculating process 140a, a high confidence factor combination selecting progress 140b, a similar event extracting process 140c, an weight calculating process 140d and a pattern extracting process 140e as shown in FIG. 17. The processes 140a to 140e correspond to the confidence factor calculator 14a, the confidence factor combination selector 14b, the similar event extracting unit 14c, the weight calculator 14d and the pattern extracting unit 14e shown in FIG. 1.

As shown in FIG. 17, in HDD 150 are provided an event set data table 150a, a confidence factor data table 150b, a high confidence factor combination data table 150c, a similar event data table 150d, an weight data table 150e, a new combination data table 150f and a pattern data table 150g.

CPU 140 reads out event set data 160a, confidence factor data 160b, high confidence factor combination data 160c, similar event data 160d, weight data 160e, new combination data 160f and pattern data 160g from the data tables 150a to 150g, stores these data into RAM 160, and executes the processing on the basis of the data 160a to 160g stored in RAM 160. The data 160a to 160g correspond to the event set storage unit 13a, the confidence factor storage unit 13b, the high confidence factor combination storage unit 13c, the similar event storage unit 13d, the weight storage unit 13e, the new combination storage unit 13f and the pattern storage unit 13g shown in FIG. 1.

With respect to the programs 130a to 130e, these data are not necessarily required to be stored in ROM 130 from the beginning. For example, the respective programs may be stored in a "portable physical medium" such as a flexible disk (FD), CD-ROM, a DVD disc, a magnetooptical disk, an IC card or the like which is inserted into the computer 110, a "fixed physical medium" such as HDD or the like which is provided at the inside or outside of the computer 110, or "another computer (or server)" connected to the computer 110 through a public circuit, the Internet, LAN, WAN or the like, and the computer 110 may read out and execute these programs.

Thus, the embodiments provide an apparatus (machine) that extracts a rare pattern that may be difficult to extract by extracting data where a rare pattern is likely to be exist, then generating the pattern using a degree of influence.

According to an aspect of the embodiments of the invention, any combinations of the described features, functions, operations, and/or benefits can be provided. The embodiments can be implemented as an apparatus (a machine) that includes computing hardware (computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. An apparatus (e.g., the pattern extracting device 10, etc.) comprises a controller (CPU) (e.g., a hardware logic circuitry based computer processor that processes or executes instructions, namely software), computer readable recording media, transmission communication media interface (network interface), and/or a display device, all in communication through a data communication bus. The results produced can be displayed on a display of the computing hardware. A program/software implementing the embodiments may be recorded on computer readable media comprising computer-readable recording media. The program/software implementing the embodiments may also be included/encoded and transmitted over transmission communication media.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A pattern extracting device for extracting as a pattern from events, which include explaining variable values and a specific target variable value, a combination of the explaining variable values for which a rate at which events that have the specific target variable value are contained in all events having a combination of the explaining variable values, satisfies a predetermined satisfaction level, comprising:
    a confidence factor calculating unit that calculates, for every event, a confidence factor representing a degree of reliability indicating that the events having the specific target variable value are contained in all the events having the combination of the explaining variable values;
    a high confidence factor combination selecting unit that selects as a high confidence factor combination, events that have a combination of the explaining variable values for which the calculated confidence factor satisfies a predetermined threshold value; and
    a pattern extracting unit that extracts another pattern from the combination of the explaining variable values in the events of the high confidence factor combination, when a rate at which the events that have the specific target variable values are contained in all the events of the high confidence factor combination, satisfies the predetermined satisfaction level.

2. The pattern extracting device according to claim 1, wherein the confidence factor calculating unit does not calculate any confidence factor for an event which does not have the specific target variable value as a constituent element.

3. The pattern extracting device according to claim 1, wherein the high confidence factor combination selecting unit selects a high confidence factor combination by setting as the predetermined threshold value a rate at which events having a specific target variable value as a constituent element are contained in all events contained in an event set containing plural conditions, each event constructed by associating a combination of explaining variable value indicating a condition of each explaining variable with a target variable value indicating a condition of a target variable.

4. The pattern extracting device according to claim 1, wherein the high confidence factor combination selecting unit selects a high confidence factor combination from combinations of the explaining variable values other than the combination of the explaining variable value constituting the pattern extracted by the pattern extracting unit.

5. The pattern extracting device according to claim 1, wherein the certain factor calculating unit calculates a confidence factor by using each event which does not use as a constituent element the combination of the explaining variable values extracted by the pattern extracting unit.

6. The pattern extracting device according to claim 1, further comprising an weight calculating unit for calculating an weight used to generate a new combination of explaining variable values for every explaining variable value possessed by the high confidence factor combination selected by the high confidence factor combination selecting unit, wherein the pattern extracting unit generates the new combination of explaining variable values by using the weight calculated by the weight calculating unit, and when a rate, at which events having a specific target variable value as a constituent element are contained in all events having the new combination of explaining variable values as a constituent element, satisfies a predetermined satisfaction, the pattern extracting unit extracts the new combination of the explaining variable values as the pattern.

7. The pattern extracting device according to claim 6, wherein the pattern extracting unit generates the new combination of explaining variable values by successively deleting the explaining variable values from the combination of the explaining variable values possessed by the high confidence factor combination in an increasing order of the weight calculated by the weight calculating unit.

8. The pattern extracting device according to claim 6, wherein with respect to each explaining variable value indicating a range of a numerical value as a condition possessed by the high confidence factor combination, the pattern extracting unit generates the new combination of explaining variable values by enlarging the range of the numerical value indicated by the explaining variable value to change the range to a range of a numerical value having a highest rate at which events having a specific target variable value as a constituent element are contained.

9. The pattern extracting device according to claim 6, further comprising a similar event set extracting unit for extracting from a event set a set of similar events which are similar to each event having as a constituent element the confidence factor combination selected by the high confidence factor combination selecting unit, wherein the weight calculating unit calculates the weight from the set of the similar events extracted by the similar event set extracting unit.

10. The pattern extracting device according to claim 6, wherein the pattern extracting unit generates the new combination of explaining variable values by adding explaining variable values in a decreasing order of the weight calculated by the weight calculating unit.

11. A pattern extracting method of extracting as a pattern from events, which include explaining variable values and a specific target variable value, a combination of the explaining variable values for which a rate at which events that have a specific target variable value are contained in all events having a combination of the explaining variable values, satisfies a predetermined satisfaction level, comprising:
    calculating, for every event, a confidence factor representing a degree of reliability indicating that the events having the specific target variable value are contained in all the events having the combination of the explaining variable values;
    selecting as a high confidence factor combination, events that have a combination of the explaining variable values for which the calculated confidence factor satisfies a predetermined threshold value; and extracting another pattern from the combination of the explaining variable values in the events of the high confidence factor combination, when a rate at which the events that have the specific target variable values are contained in all the events of the high confidence factor combination, satisfies the predetermined satisfaction level.

* * * * *